3,413,140
COATING OF AUTOCLAVED ASBESTOS-
CEMENT PRODUCTS
William A. Heausler, New Orleans, La., and Robert M. Johnson, Kenmore, N.Y., assignors to National Gypsum Company, Buffalo, N.Y., a corporation of Delaware
No Drawing. Filed Jan. 4, 1965, Ser. No. 423,359
14 Claims. (Cl. 117—72)

ABSTRACT OF THE DISCLOSURE

The surface of a steam-cured asbestos-cement product is coated, first, with a dilute solvent solution of a resin, to form a substantially continuous, resin substrate, which is capable of being penetrated by the vehicle of a subsequently applied paint.

---

The present invention relates to a process for treating asbestos-cement and similar products in order to increase the adhesion of finish coatings to the surface of such products. More particularly, it relates to a process for coating autoclave steam-cured asbestos-cement and similar products with a sealer prior to applying a primer or decorative finish coating in order to provide lasting adhesion and durability of the coating.

Asbestos-cement products possess characteristics which make them desirable as biulding materials, for they are incombustible, durable and corrosion resistant. Accordingly, asbestos-cement products are used on exterior surfaces of buildings in the form of shingles, vertical or panel siding, clapboards, and the like. In recent years, it has been desired, for economic and aesthetic reasons, to provide such asbestos-cement products with a primer or a decorative coating. In order to be acceptable, such a coating must have not only high mar resistance and general film strength in order to resist the deleterious effects of long exposure to the elements, but the coating must also have good adhesion to the asbestos-cement substrate in order to be durable. A coating material which is not firmly bonded to the asbestos-cement substrate tends to fail, as by chipping or flaking off after only short periods of exposure to the elements.

One important factor which affects the ability of coating materials to bond to autoclaved steam-cured asbestos-cement products is that during the autoclaving step, hydrated calcium silicate salts are formed at the surface of the products and the primer or decorative coating fails to penetrate or bond to those salts. As a result of this lack of penetration or bonding to the salts, there is poor adhesion of the coating to the asbestos-cement substrate and the coating flakes or chips off within a short time after outdoor exposure.

In order to overcome this problem, it has been necessary for the industry to pretreat the asbestos-cement products in the uncured state in order to provide a base to which the primer or decorative coating can adhere. Thus, it is common in the industry to apply a coating of an aqueous emulsion of a thermoplastic resin to the surface of an uncured sheet of asbestos-cement and then steam-cure the sheet in the usual manner in an autoclave in order to provide a cured sheet having a coalesced resin film bonded to the surface thereof. A decorative coating is then applied after autoclaving. This two-step process is, however, unsatisfactory for a number of reasons. For example, since the asbestos-cement sheets have poor strength in the uncured or partially cured state and are susceptible to breakage in handling, it is very difficult to coat large sheets, such as sheets 4' x 8' to 4' x 12' or long clapboards, in the uncured state. Coating the uncured sheets with the water-base resin results in the breakage or damage of a substantial number of the sheets, thereby increasing the manufacturing cost of the product. Also, extreme care must be used in handling the resin-coated, uncured sheets to prevent scuffing of the sheets. Any abrasion or scuffing of the sheets prior to curing is magnified greatly in the cured sheets to cause rejects in subsequent operations. Furthermore, this prior art process requires two separate coating steps with double handling of the sheets, thereby further increasing the manufacturing cost of the product and increasing the opportunity for breakage of the product in handling.

Thus, despite the fact that it is well-known that autoclaved asbestos-cement products have greater dimensional stability than normal-cured asbestos-cement products, the use of the autoclaved material has been limited by the inability to provide a durable, weather-resistant decorative coating on the material, without giving rise to problems in the handling of uncured asbestos-cement products which results in an increase in the manufacturing cost of the product. Due to the lack of adhesion to the hydrated salts formed at the surface of the sheets during autoclaving, coating of the sheets with the aqueous resin after autoclaving has been considered to be not feasible, for the water-base resin could not penetrate or bond to the salts. For this reason, it has been necessary to treat the uncured sheets, despite the difficulty in handling and working with the weak, uncured material.

It is therefore an object of the present invention to provide a process for treating asbestos-cement and similar products to increase the durability of finish coatings applied thereto.

Another object of the present invention is to provide a process for increasing the adhesion of primer and/or decorative coatings on asbestos-cement substrates.

Another object is to provide a process for manufacturing durable, weather-resistant asbestos-cement products having a finish coating of paint.

Another object is to provide a process for treating steam-cured asbestos-cement products to increase the adhesion and durability of coatings applied to the product.

A further object is to provide a decorative and durable asbestos-cement product which will have increased resistance to weathering conditions.

Another object is to provide a coating on steam-cured asbestos-cement substrates to increase the adhesion of primer and/or finish coatings on the substrate.

Various other objects and advantages will appear from the following description of the invention, and the novel features will be particularly pointed out hereinafter in the appended claims.

These and other objects of the invention are attained by the present invention which provides a process in which a durable water-base primer or decorative top coat can be applied to an autoclaved asbestos-cement product without danger of the coating flaking or chipping off, even after prolonged exposure to weathering conditions. According to the present invention, an autoclaved, hardened asbestos-cement sheet is sprayed or otherwise coated with a solvent solution of a clear resin to deposit on the surface of the sheet from about 0.2 to about 0.6 gram of resin solids per square foot of the sheet. Preferably, the solvent solution contains about 5% of resin solids, but solutions containing between about 3% to 10% of resin may be used. The coated sheet is then passed through a heated zone to remove solvent vapor fumes and to cure the clear resin, thereby forming a substantially continuous coating over the asbestos-cement sheet. A water-base latex paint primer or decorative coating may be then applied to the resin-coated sheet to provide a durable, weather-resistant decorative asbestos-cement product.

It is to be understood that the process of the present invention may be used to provide not only durable, weather-resistant asbestos-cement sheets, but may also be used to coat asbestos-cement products which are modified with a minor amount of cellulose fibers. Similarly, the process of the present invention is also applicable to lime-silica substrates. Therefore, it will be understood that all references in the present disclosure and claims to "asbestos-cement products" refer not only to conventional asbestos-cement products, but also to lime-silica substrates and to asbestos-cement which is modified with a minor amount of cellulose fibers.

The present invention provides the advantage that a durable decorative coating can be provided on asbestos-cement products by treating the products after they have been hardened by autoclaving. Thus, because the products are autoclaved in an atmosphere of high-pressure steam to steam cure the products, they possess dimensional stability, and since the products are not treated with the resin sealer until after they have been autoclaved and hardened, they are not subject to the disadvantages inherent in the prior art process discussed hereinabove. While it has been considered heretofore not to be feasible to apply an aqueous emulsion of a resin after the autoclaving step, due to the lack of bonding to the salts formed on the surface of the asbestos-cement sheets during autoclaving, the present invention provides a solvent solution of a clear resin which effectively penetrates through the salt deposits and bonds to the asbestos-cement and provides a substrate for the finish coating, thereby increasing the adhesion and durability of the finish coating to the asbestos-cement product.

In accordance with the present invention, an asbestos-cement sheet or board is formed in the conventional manner and the sheet autoclaved in an atmosphere of high pressure steam to steam cure the asbestos-cement. A solvent solution of clear resin, the solution containing from about 3% to about 10% of resin, is then applied as by spraying, flooding, dipping, mopping, etc., to the surface of the autoclaved sheet at a uniformly deposited loading of between 0.2 to 0.6 dry gram of resin per square foot of the asbestos-cement sheet. It is highly advantageous that the loading of the resin be maintained within these limits. The resin-coated sheet is then pressed through a heated zone, having a temperature of between about 75° F. to 175° F., to remove solvent vapor fumes and to cure the resin, thereby forming a substantially continuous resin coating over the surface of the sheet. The resin penetrates through the hydrated salts formed at the surface of the sheet during autoclaving and bonds to the asbestos-cement, thereby providing an integrally bonded substrate for the primer or decorative coating. A primer or decorative coating is then applied by spraying or otherwise applying a water-base latex paint, such as, for example, a water emulsion of a thermoplastic or thermosetting resin, over the cured resin coating. The primer or decorative-coated product is subsequently heated to coalesce the paint, thereby forming a paint film firmly adhering to the resin coating. In order to facilitate the coalescing of the latex film, the autoclaved sheet may be preheated prior to the application of the resin coating, so that the surface temperature of the uncoated sheet is between about 110° F. and 160° F.

Suitable clear resins which form a substantially continuous coating integrally bonded to autoclaved asbestos-cement sheets are butyral resins and acrylic resins. It has been discovered that a solvent solution of either of these resins is able to penetrate through the hydrated silicate salts formed during autoclaving and bond to the asbestos-cement, thereby providing a permanent, integrally bonded substrate for the water-base latex paint coatings. As a result, there is good adhesion of the latex paint coating so that the paint coating does not flake or chip off even after prolonged exposure to weathering conditions. Resins which are preferred are polyvinyl butyral and methyl methacrylate.

Solvents which may be used in the present invention are alcohol, such as methanol, ethanol, isopropanol, and the like; xylene; toluene; ethers, such as ethylene glycol monomethyl ether, ethylene glycol monoethyl ether; ketones, such as methyl isobutyl ketone and methyl isoamyl ketone; esters; and chlorinated hydrocarbons. Also, mixtures of these solvents may be used to form the resin solution. For example, mixtures of ethanol and toluene, ethanol and xylene, isopropanol and xylene, ethylene glycol monomethyl ether and xylene, ethylene glycol monomethyl ether and xylene; ethylene glycol monoethyl ether, ethanol, and xylene; and ketones and toluene have been successfully used as the solvent for the resins. The preferred solvent for use with the polyvinyl butyral resin is a mixture of ethanol and xylene or toluene, while ketones and toluene are preferred for use with the methyl methacrylate resin.

As noted above, it is highly advantageous that the resin be applied to the autoclaved sheets at a loading of from 0.2 to 0.6 gram per square foot, for at this loading the clear resin penetrates through the hydrated salts and bonds to the asbestos-cement to provide a permanent substrate for the water-base latex paint coating. At a resin loading within this range, the water-base latex coating firmly adheres to the resin coating, forming a smooth, durable, decorative, weather-resistant product. At this loading there is partial absorption of the latex paint water vehicle into the asbestos-cement subtrate and partial absorption of the water vehicle into the atmosphere, thereby providing uniform deposition and good adhesion of the decorative coating. A lower loading than that specified above results in poor adhesion of the primer or decorative coating so that it flakes or chips off after only short periods of exposure. If the resin is applied at a loading of higher than 0.6 gram per square foot, the latex water vehicle is unable to penetrate through the resin coating and is removed only by evaporation into the atmosphere with the result that the latex coating tends to crack or craze. As a result, it is extremely difficult to obtain a smooth, continuous latex film when such a higher resin loading is applied. Also, the latex coating tends to blister if a higher resin loading is applied. It is preferred to apply the resin solution at a loading of 0.3 to 0.4 dry gram per square foot, for this loading is optimum for good film continuity and adhesion of the primer or decorative coating.

The following preferred embodiment is illustrative of the present invention, but it is not intended to limit the invention to the materials, proportions or conditions set forth therein.

A cellulose fiber-modified asbestos-cement board, having a density of about 55 pounds per cubic foot, was prepared by the wet (Hatschek) process, using a conventional cylinder-type forming machine. Thus, a slurry was formed of asbestos fibers, portland cement, silica, water, and a minor amount of cellulose fibers. The slurry was picked upon screens, transferred to a felt and then to an accumulator roller from which it was cut off in sheet form. The sheets were passed through a drier to remove surface moisture, under pressure rollers to press the sheets to a thickness of about ½ inch, through slitter knives to cut them to size, and were then pre-cured by storing them at room temperature for 2 to 14 days. The pre-cured sheets were then steam-cured by autoclaving in an atmosphere of high pressure saturated steam at a pressure ranging from about 100 to about 125 p.s.i. and a temperature of between about 335° F. and 355° F. for a period of about 8 to 20 hours.

The hardened, steam-cured sheets were passed through a preheat oven having a temperature of 350° ±50° F. so that the surface temperature of the sheets was between about 115° F. to 130° F. The sheets were then sprayed with a 5% solvent solution of a clear resin at a rate such that about 0.3 to 0.4 gram of resinous solids per square foot was deposited on the sheet. The resin solution consisted of polyvinyl butyral resin in a solvent of ethanol and xylene. The polyvinyl butyral resin used was obtained from the Shawinigan Resins Corporation under the designation "Butvar B-90" and had a butyral content (as percent polyvinyl butyral) of about 80%, an acetate content (as percent polyvinyl acetate) of about 1%, an hydroxyl content (as percent polyvinyl alcohol) of between 18% to 20%, and a specific gravity of 1.100.

Solvent vapor fumes were removed and the resin cured by passing the sheets through a heated section having a temperature of between about 75° F. to 175° F. and the resin-coated sheets then sprayed with a water-base latex paint at a uniformly distributed loading of 10 to 20 wet grams per square foot. The latex-coated sheets were then passed through a post-heat oven having a temperature of about 200° F. to 400° F. The latex paint coating was free of blisters and was completely coalesced.

Example

In order to demonstate the excellent adhesion and durability of decorative coatings on asbestos-cement products produced according to the present invention, four uncoated, steam-cured, cellulose fiber-modified, asbestos-cement sheets were prepared according to the procedure described above. Sheet No. 1 was sprayed with a 5% solution of polyvinyl butyral resin in a solvent consisting of a mixture of ethanol and xylene to a loading of 0.3 gram of resin per square foot. Sheeet No. 2 was sprayed with this same resin solution to a loading of 0.6 gram per square foot. Sheet No. 3 was sprayed with a 7.5% solution of methyl methacrylate resin in a solvent consisting of a mixture of ketone and toluene to a loading of 0.4 gram per square foot. Sheets 1, 2 and 3 were then heated to remove solvent vapor fumes and to cure the resin, and then sprayed with a finish coating of water-base latex paint. Sheet No. 4 was not coated with a resin sealer, but the steam-cured sheet was preheated and the same water-base latex paint used to coat sheets 1, 2, and 3 was sprayed on sheet No. 4. Each of the sheets 1 through 4 was then heated at a temperature of between 260° F. to 280° F. to coalesce the paint film and the sheets tested to evaluate the adhesion and durability of the paint film.

The adhesion of the paint film to the substrate was determined by pressing a three-inch piece of pressure-sensitive adhesive tape firmly down on the paint film (adhesive side down), leaving only about ½ inch at one end of the tape free from contact. The tape was then removed in one uniform motion, and adhesion of the paint film to the sheet was reported as excellent, good, fair, or poor. The results of this test are reported below.

In order to determine the durability of the latex coating, each of the sheets was subjected to 10 freeze-thaw cycles while immersed in water. Each cycle consisted of immersing the sheet in water and placing the immersed sheet in a freezer at −20° F. for 16 hours. The sheet, still immersed, was then allowed to thaw for 8 hours at room temperature (70°–80° F.) and the paint film inspected for failure, such as flaking, chipping, blistering, and the like. This freeze-thaw cycle was repeated 10 times for each of the sheets. The results of this test are reported below.

bestos-cement product to provide a substantially continuous coating of the clear resin integrally bonded to the surface of the asbestos-cement product, and then applying a water-base latex paint, such as, for example, a water emulsion of a thermoplastic or thermosetting resin, over the resin coating.

We claim:

1. The process for manufacturing durable, weather-resistant asbestos-cement products which comprises coating the surface of an autoclave steam-cured asbestos-cement sheet with a volatile organic solvent solution of a substantially clear penetrable continuous-film forming resin, curing the resin to form an integrally bonded resin coating on the asbestos-cement sheet, applying a top coating of latex paint over said resin coating, and coalescing the paint to form an integral, continuous paint film firmly adhering to the resin coating, said resin being applied at a loading sufficient to provide a substantially continuous resin substrate for the paint coating while permitting at least a portion of the vehicle of said top paint coating to penetrate through the resin coating and be absorbed into the asbestos-cement sheet.

2. The process as defined in claim 1 in which the clear resin is a resin selected from the group consisting of butyral resins and acrylic resins.

3. The process as defined in claim 2 in which the solvent solution of clear resin is coated on the surface of the steam-cured asbestos-cement product at a uniformly distributed loading of from 0.2 to 0.6 gram of resin per square foot.

4. The process as defined in claim 2 in which the solvent is selected from the group consisting of alcohols, esters, ethers, ketones, xylene, toluene, chlorinated hydrocarbons, and mixtures thereof.

5. The process for treating an autoclave steam-cured asbestos-cement sheet which comprises coating the surface of said autoclave steam-cured asbestos-cement sheet with a volatile organic solvent solution of a resin selected from the group consisting of butyral resins and acrylic resins, at a uniformly deposited loading of between 0.2 and 0.6 gram of resin per square foot of said asbestos-cement sheet, and curing said resin to form a substantially continuous resin coating integrally bonded to the asbestos-cement sheet.

6. The process as defined in claim 5 in which said resin is cured by heating the resin-coated sheet at a temperature of between about 75° F. and 175° F.

7. The process as defined in claim 5 in which said solvent solution comprises from about 3% to about 10% of said resin in a solvent selected from the group consisting of alcohols, esters, ethers, ketones, xylene, toluene, chlorinated hydrocarbons, and mixtures thereof.

8. The process as defined in claim 5 in which said resin is selected from the group consisting of polyvinyl butyral and methyl methacrylate.

9. The process as defined in claim 5 in which said steam-cured asbestos-cement sheet contains a minor amount of cellulose fibers.

10. The process for manufacturing decorative and durable asbestos-cement sheets resistant to weathering conditions which comprises coating the surface of an autoclave steam-cured asbestos-cement sheet having a surface temperature of between about 110° F. and 160° F. with a volatile organic solvent solution of a substan-

| Sheet No. | Resin coating | | | Adhesion of paint | Durability of paint |
|---|---|---|---|---|---|
| | Resin | Solvent | Loading (gram) | | |
| 1 | Polyvinyl butyral | Ethanol and xylene | 0.3 | Excellent | No failure of paint film after 10 cycles. |
| 2 | do | do | 0.6 | do | Do. |
| 3 | Methyl methyacrylate. | Ketone and toluene | 0.4 | do | Do. |
| 4 | | | | Fair | Paint film failed after 1 cycle. |

The results of these tests clearly show that a latex paint coating having excellent adhesion and durability can be formed on asbestos-cement products by applying a solvent solution of a clear resin to a steam-cured astially clear penetrable continuous-film-forming resin to deposit thereon from 0.3 to 0.4 gram of resin per square foot, said solvent solution comprising from 3% to 10% of a resin selected from the group consisting of polyvinyl butyral resin and methyl methacrylate resin in a solvent selected from the group consisting of alcohols, ketones, esters, ethers, xylene, toluene, chlorinated hydrocarbons, and mixtures thereof, heating said resin-coated sheet to a temperature of from 75° F. to 175° F. to remove solvent vapor fumes and cure said resin to form a substantially continuous resin coating integrally bonded to said steam-cured sheet, spraying a water-base latex paint on the resin-coated asbestos-cement sheet and heating the paint-coated sheet to a temperature of between about 200° F. to 400° F. to coalesce the paint, thereby forming a durable, decorative asbestos-cement sheet resistant to weathering conditions.

11. The process as defined in claim 10 in which the solvent solution of clear resin consists essentially of about 5% of polyvinyl butyral resin in a solvent of ethanol and toluene.

12. The process as defined in claim 10 in which the solvent solution of clear resin consists essentially of about 7.5% methyl methacrylate resin in a solvent of a mixture of ketone and toluene.

13. A durable, decorative, weather-resistant, autoclave steam-cured asbestos-cement product which comprises a sheet of steam-cured asbestos-cement having on at least one surface thereof a substantially continuous coating of a clear resin at a uniformly deposited loading of from 0.2 to 0.6 gram of resin per square foot of said sheet, integrally bonded to said sheet, said resin being selected from the group consisting of polyvinyl butyral and methyl methacrylate, and a continuous film of latex paint over and integrally bonded to said resin coating.

14. The product as defined in claim 13 in which said steam-cured asbestos-cement product contains a minor amount of cellulose fibers.

References Cited
UNITED STATES PATENTS

| | | | |
|---|---|---|---|
| 2,221,420 | 11/1940 | Clarvoe et al. | 117—126 |
| 2,716,619 | 8/1955 | Jobbins et al. | 117—72 |
| 2,837,444 | 6/1958 | Hahn | 117—123 X |
| 3,000,842 | 9/1961 | Homier et al. | 117—126 X |
| 3,011,988 | 12/1961 | Luedke et al. | 117—126 X |
| 3,085,907 | 4/1963 | Zdanowski et al. | 117—123 X |
| 3,106,486 | 10/1963 | Harren et al. | 117—123 |

WILLIAM D. MARTIN, *Primary Examiner.*

R. HUSACK, *Assistant Examiner.*